United States Patent [19]

Lasas

[11] 3,927,965

[45] Dec. 23, 1975

[54] DIRECT AND ACID DYES WITH THE SAME DYE CHLORINE DECOLORED AS LEVELLER

[75] Inventor: Longinas Lasas, Los Angeles, Calif.

[73] Assignee: United States Gypsum Company, Chicago, Ill.

[22] Filed: Dec. 17, 1973

[21] Appl. No.: 425,368

Related U.S. Application Data

[62] Division of Ser. No. 271,967, July 14, 1972, Pat. No. 3,807,947.

[52] U.S. Cl. .................................. 8/89; 8/81; 8/83; 210/62
[51] Int. Cl.² ........................................ D06P 1/620
[58] Field of Search ......... 8/81, 89, 83, 102; 210/62

[56] References Cited
UNITED STATES PATENTS 3,807,947  4/1974  Lasas ......................................... 8/81

FOREIGN PATENTS OR APPLICATIONS 605,258  7/1948  United Kingdom ....................... 8/81

*Primary Examiner*—Donald Levy
*Attorney, Agent, or Firm*—Nilsson, Robbins, Bissell, Dalgarn & Berliner

[57] ABSTRACT

A novel solution obtained from a process for treating dyehouse waste water, containing leftover dyestuff, for reclamation and reuse for consecutive dyeing and/or rinsing or the like, in which halogen, such as gaseous chlorine, is added to decolorize the chromophoric functional group of the dyestuff. The decolorized waste water is then recycled into the dyeing system to form the present solution.

3 Claims, No Drawings

DIRECT AND ACID DYES WITH THE SAME DYE CHLORINE DECOLORED AS LEVELLER

This is a division of application Ser. No. 271,967, filed July 14, 1972, now U.S. Pat. No. 3,807,947.

FIELD OF THE INVENTION

The present invention generally relates to dyeing process and more particularly to improvements in textile dyeing processes which permit the reclamation and recycling of dyehouse waste water.

BACKGROUND AND SUMMARY OF THE INVENTION

In conventional textile dyeing processes, and related dyeing processes such as those commonly used in the dyeing of leather goods and the like, vast quantities of waste treating solutions are produced which contain dyes. The quantities of waste water so produced are very large due to the millions of yards of goods dyed each year in a great number of plants. Such dye-containing solutions in the past have been merely dumped into waste disposal areas such as streams, pits and the like.

More recently, anti-pollution measures have required clean-up of such waste waters before their disposal. Such clean-up measures usually consist of decolorizing the dyes and then precipitating the dye molecules with various chemicals and removal of solid residue. Obviously, such clean-up steps are expensive and time consuming and also may result in the formation of certain dissolved salts and the like which may in themselves present a potential environmental hazard. Accordingly, it would be highly desirable, both from an economic standpoint and from an ecological standpoint to provide a way of treating such waste waters so as to reduce or eliminate the necessity of their disposal.

As further background to the present invention, some details of textile dyeing operations can be noted. The dyestuffs used in such operations bear color-imparting groups and may be nonionic (disperse and polyester disperse), cationic or anionic (direct and acid) in nature. Other dyes such as the vat and sulfur types are also used. Dyes of such chemical classifications as azo, diazo, nitro and the like have been used successfully for a number of years. Various dye combinations can be used in, for example, polychromatic four-tone or polyester three-tone applications. In the dyeing operation leveling dye assistants are needed to slow down the colorizing rate sufficiently to enable the dye plant operator to gain precise control over the intensity of shades desired. Such levelers normally operate to preferentially and loosely attach to the available fiber dye sites and/or react with the dye molecules to loosely bond thereto. In each instance, a finite period of time is needed by the dye molecules to overcome such blocking, i.e., to dislodge the leveler from the textile dye sites and/or strip off the attached leveler from the dye molecules themselves.

Dye assistants represent a considerable cost outlay in the dyeing process and are lost with each batch of waste water discarded. In a continuous process, they have to be added to the dye-containing treating agent before or during textile dyeing, since a substantial proportion of the dye assistant is absorbed by the textile during the dyeing step. Accordingly, it would also be highly desirable to reduce the expense normally incurred in connection with the use of dye assistants.

The foregoing needs have been satisfied by the present invention which provides a novel process for dyehouse water reclamation.

Specifically, waste waters from a conventional textile dyeing process are treated in a novel manner, rather than being discarded with or without previous treatment to destroy dyes therein. In this regard, waste waters containing chromophoric dye are decolorized by a suitable agent such as halogen, for example, chlorine gas, as by bubbling therethrough, and the resulting solution or suspension (which latter term is used as generic to solution and includes also colloidal or other true suspensions) is then reused in the dyeing process, e.g., as a medium for dyeing, as rinse water, as coolant, or the like. A valuable product, a leveling dyeing assistant is generated from materials normally discarded in conventional dye plant procedures.

The present procedure is readily adaptable for use on a batch, semi-batch, continuous or semi-continuous basis. In fact, the process can be carried out in such a manner that no dyehouse waste water need be disposed of at all. Instead, the waste water can be completely recycled in a closed loop operation to provide substantial savings in time, effort and money. The dye destruction and coagulation steps normally used can be eliminated while recovering a useful product. Moreover, the environment benefits since waste disposal is eliminated.

Accordingly, the present invention provides increased utility and economy in an important industry. Further advantages of the invention are as set forth in the following detailed description.

DETAILED DESCRIPTION

For present purposes, dyestuffs normally employed in the carpet dyeing industry and in the dyeing of certain other textiles, such as clothing, leather, paper and the like, can be treated by the present invention. For example, azo dyes, diazo dyes, alizarin, anthraquinone and the nitro dyes are treated. These and other types of dyestuffs are well known to the art and detailed mention thereof is, therefor, not necessary. In the dyeing of carpeting, a leveling dye assistant can be employed. Commercial brands of such agents include those sold under the trademark TAMOL S.N. of Rohm and Haas and under the trademark LOMAR P.W. of NAPCO and are useful as make-up agents in the present process. The nature of such types of levelers is well known to the art.

The conventional dyeing process utilizes water in various phases, such as in the dyeing itself, in rinsing, in cooling, in softening where necessary, etc. In conducting each phase, the usual procedure is to "drop" the water into a "ditch" from where it is disposed into the city sewage system, lakes, rivers, etc., to pollute the same. In the present process, the waste water is taken from the "ditch" to a reclamation tank. In the reclamation tank, gaseous chlorine is bubbled through the waste water and instantly forms hydrochloric acid and hypochlorous acid in accordance with the following generalized equation:

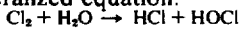
$Cl_2 + H_2O \rightarrow HCl + HOCl$

The hydrochloric acid (strong acid) ionizes and suppresses ionization of the hypochlorous acid (weak acid). The latter is most effective as a decolorizing agent when it is in the unionized form. Such agent decolorizes the dyestuff while keeping it otherwise intact. Accordingly, it can, if desired, perform a function of occupying textile dye sites in competition with the dye molecules to delay the striking by the dye on a textile exposed thereto. In other words, the decolorized solution can be used as a dyestuff leveling solution.

Usually, the chlorine is used in the present process in a concentration of about 0.5–1.5 pounds per about 2500 gallons of waste water, with the higher concentrations being used with high dyestuff concentrations in the waste water. Such chlorine concentration is sufficient to effectively decolorize the dyestuff and to cause the pH of the aqueous suspension or solution to be about pH 6.5 or less. Typical treating times are about 10–40 minutes. Moreover, the amount of chlorine necessary to decolorize the dyestuff can be calculated, or adjusted, to provide an amount slightly in excess thereof, all in accordance with the present invention. The pH of the resulting decolorized solution can then be adjusted, if desired, after checking with a standard type pH meter. In accordance with the invention, excess chlorine is then neutralized or destroyed with a suitable antichlor, for example, sodium bisulfite, sodium sulfite or the like.

Although chlorine has been employed in certain conventional procedures for treating waste solutions of dye, such procedures make no attempt to recycle the water solutions and, instead, employ dye molecule-destroying steps entirely avoided in the present process. Thus, in conventional processes such agents as ferric chloride, ferric sulfate and aluminum sulfate are used to coagulate and precipitate the decolorized dye. This results in a solid waste disposal problem.

It will be noted that it is desired to decolorize on the acid side. As the pH increases above about neutral pH, the decolorization reaction slows down, so that at a pH of about 9.0 and above, substantially no or little decolorization occurs. Although so-called commercial liquid chlorine can be employed in the present process, it is not preferred as the decolorizing agent. In this regard, liquid chlorine contains 15% sodium hypochlorite, NaOCl, which yields a major proportion of sodium hydroxide (to provide a basic pH), is costly and unstable and yields only a minor amount of free chlorine.

After chlorine treatment and addition of antichlor, as above, the waste water is now ready to be recycled back into the dyeing system for use in place of, and as a fully satisfactory substitute for, fresh water. Thus, it can be used in the dyeing step. In this regard, as an added advantage, the amount of leveling dye assistant which must be added can be greatly reduced, or even eliminated in some cases. This results from the fact that the decolorized dyestuff retains its site seeking ability and/or competes with the dyestuff for sites. Generally, only about 20% of the normal amount of dye assistant need be added. The types of dye assistant and procedures for their use depends, of course, on the type of dyestuff and fibers. Such is well known to the art and need not be set forth herein.

It will be understood from the above description that the present process can be carried out very conveniently and efficiently on an essentially closed loop basis, with little or no loss of waste water and without the usual involved and extensive waste water treatment and disposal of the thus treated waste water. The following specific Example further illustrates certain features of the present invention.

EXAMPLE

A textile carpet dyeing process for dyeing 1,500 lbs. of carpet is operated on an economical, closed loop basis by initially providing, in the usual way, 3,500 gallons of water to a tank containing the carpet and adding thereto about 10 lbs. Lomar PW, 1 lb. of Igepal 630 (sold by General Analine & Film Corp.), as a surface active agent, and sufficient acetic acid to reduce the pH to about 5.0. The carpet is run for about 10 minutes and then about 20 lbs. of Sulfanin Red B dye (sold by Sandoz Chemical Co.) is slowly added over a 10 minute period.

The dye bath is then run for about ten more minutes and then heated to the boiling point thereof, approximately 205°–210°F, by introducing steam to raise the temperature at a rate of about 2°F/minute. The quantity of steam ultimately added to increase the temperature of the treating bath from ambient temperature to the boiling point is about 400 gallons. After the dye bath has reached its boiling point, it is maintained at boiling for at least 30 minutes, until the proper shading has been reached. The carpeting is then separated from the dye bath solution which is dropped to a storage tank and the carpeting, after rinsing in water, is drained, squeezed and dried. Thereafter, about one half of the bath is dropped, and cold water is added to cool the carpeting to about 130°–140°F. The carpeting is then run for a few minutes to level the temperature thereof. The bath is then completely dropped. Additional cold water is added and the carpet is run therein to rinse out unexhausted dye. The additional rinse water is then dropped and the rinsing step repeated until clear (generally once or twice more). The dye bath is refilled and, if necessary, softeners, jute dyeing, etc., is added, as well known, and the carpet run therein for 10–15 minutes until properly finished. The carpet is then removed and the remaining water is dropped.

The dropped water from each of the foregoing steps is conveyed to a central ditch to mix with water from prior or other batches. The waste water is conveyed to a 10,000 gallon treatment tank for regeneration. Approximately 3 lbs. of gaseous chlorine, is fed into the treatment tank. The chlorine, as previously described, provides hypochlorous acid which completely decolorizes the dyestuff and provides a small excess of chlorine. After the decolorization step, which takes place over approximately 15–40 minutes, the decolorized solution is pumped to a 20,000 gallon storage tank. At the storage tank, which may have received decolorized solution from a different (or the same, but previously batched) treatment tank, any remaining chlorine is detected, e.g., by immersion of a potassium iodide-starch indicator strip. If there is excess chlorine, it is destroyed or neutralized by the addition of antichlor, in this case, sodium bisulfite.

Thereafter, the neutralized, treated waste water is fed into a dye bath as above and is used directly as a replacement for fresh water in all stages, including dyeing, rinsing, cooling, etc. Only a reduced amount, e.g., about 2.5 lbs. of make-up leveler is added. All other steps are identical to that for the initial processing. The process can be repeated indefinitely in the foregoing closed loop manner. A small amount of water is lost by evaporation and during drying, about 15–20% per cycle, and must be replaced.

In conducting the foregoing process, as has been previously mentioned, it can be applied to waste water contaminated by any of the known dyestuffs. Such dyestuffs include disperse, polyester disperse, acid, cationic and directs. Generally, the dyestuffs are used in a concentration of about 0.01–5 weight percent. The amount of leveling dyeing assistant used depends upon its type, to wit: nonionic assistants at about 0.001–0.01 weight percent; anionic assistants at about 0.025–1 weight percent; cationic assistants at about 0.5–1.5 weight percent; and amphoteric assistants at about 0.5–1.5 weight percent.

It may be noted that the foregoing process reconstitutes dyes into levelers but the process can also be used with materials which do not require levelers. In such use the decolorized dye molecule represents merely a harmless diluent. Thus, the reclaimed waste water can be used to dye leather goods, cellulosic materials, synthetic and natural fibers and the like, in each instance reducing the overall cost of the dyeing process by a reduction or elimination of the cost of destroying dye molecules for decontamination purposes before passage of waste dye treating water to external sources.

Accordingly, improvement in a dyeing process for textiles and the like are provided which exhibit the advantages as described above. Various modifications, changes and alterations in the steps of the process and in its parameters and in the novel dye treating agent of the present invention and its constituents can be made. All such modifications, changes and alterations as are within the scope of the appended claims form a part of the present invention.

I claim:

1. A novel dyestuff solution comprising an aqueous suspension including (1) dyestuff selected from the group consisting essentially of acid and direct dyes and (2) a leveling dyeing assistant obtained from halogen decolorization of said dyestuff.

2. The novel dyestuff solution of claim 1 wherein said dyestuff is anionic and is in a concentration of about 0.01–5 weight percent and said leveling dyeing assistant is in a concentration of about 0.025–1 weight percent.

3. The novel dyestuff solution of claim 1 wherein said dyestuff is cationic and is in a concentration of about 0.01–5 weight percent and said leveling dyeing assistant is in a concentration of about 0.5–1.5 weight percent.

* * * * *